June 12, 1962

H. TUREK 3,038,252

METHOD OF MAKING A SQUARE-CORNERED BRIDGING AND JOINING FRAME

Filed Jan. 30, 1958

INVENTOR.
HERBERT TUREK
BY
Kegan, Bellamy & Kegan
ATT'YS.

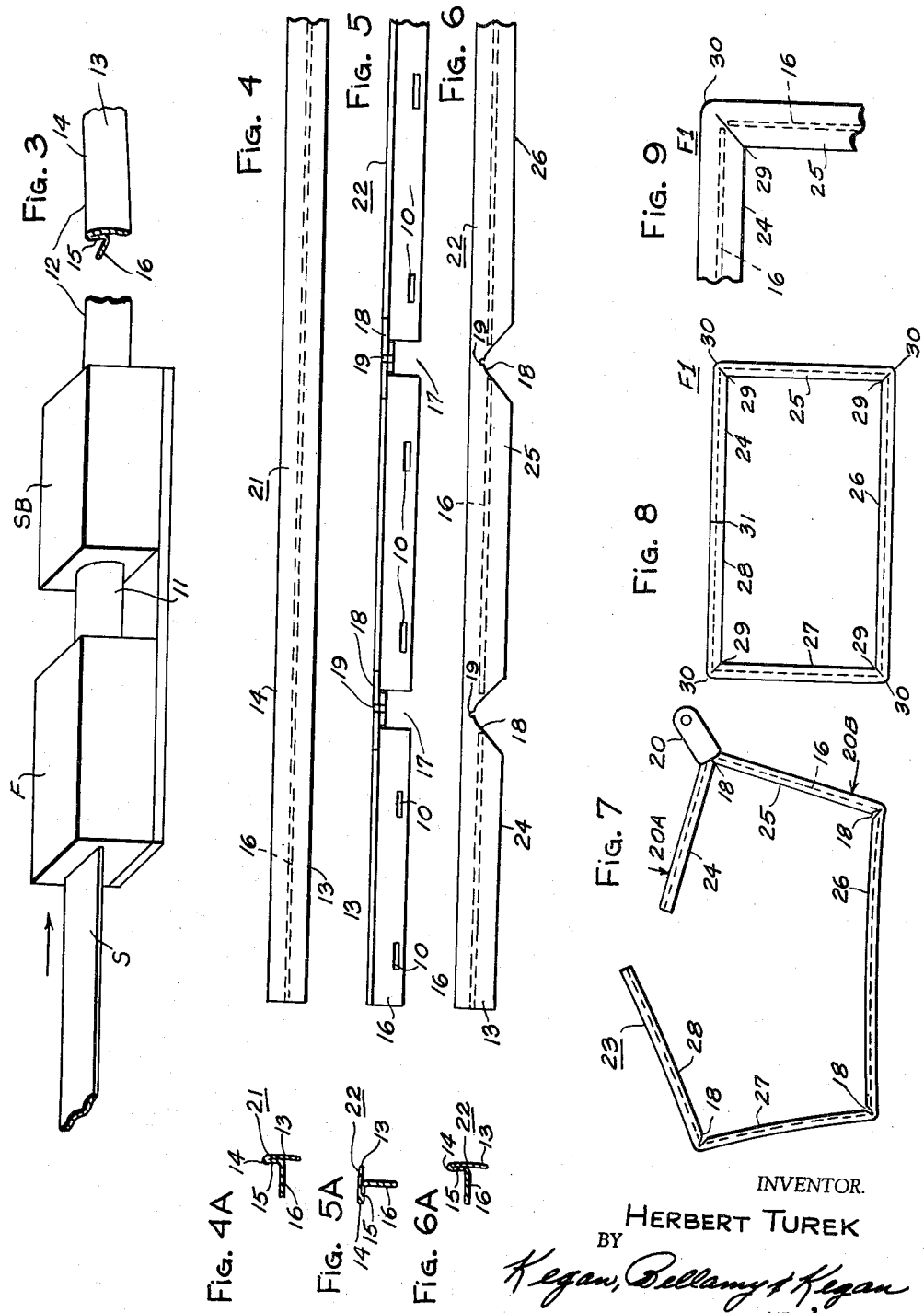

June 12, 1962  H. TUREK  3,038,252
METHOD OF MAKING A SQUARE-CORNERED BRIDGING AND JOINING FRAME
Filed Jan. 30, 1958  3 Sheets-Sheet 3
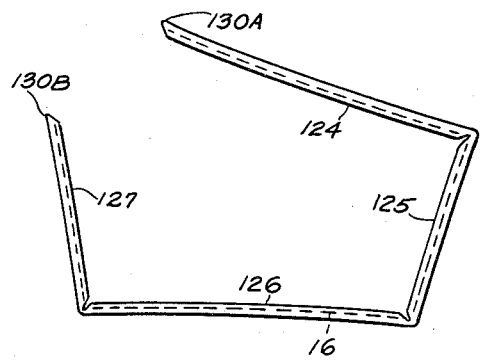
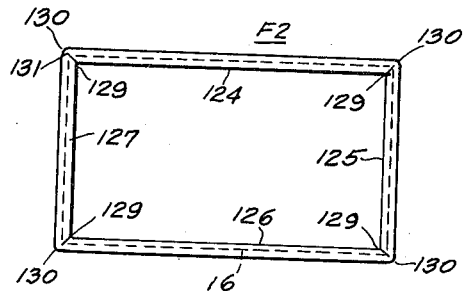
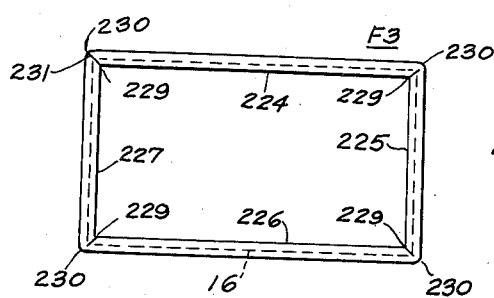
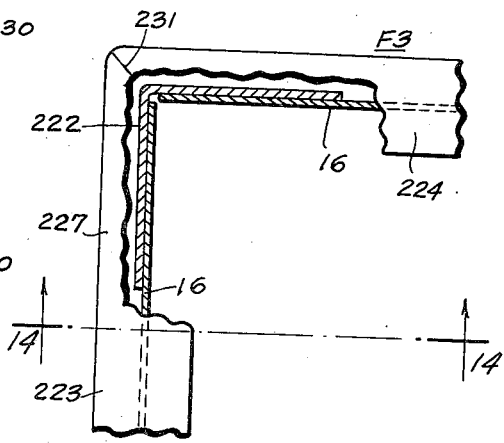
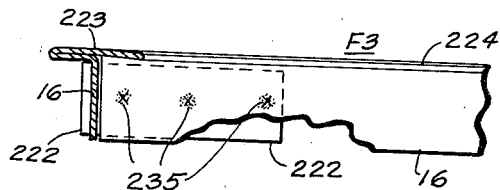
INVENTOR.
HERBERT TUREK
BY
Kegan, Bellamy & Kegan
ATT'YS.

United States Patent Office 3,038,252
Patented June 12, 1962

3,038,252
METHOD OF MAKING A SQUARE-CORNERED BRIDGING AND JOINING FRAME
Herbert Turek, Harwood Heights, Ill., assignor to Kinkead Industries, Incorporated
Filed Jan. 30, 1958, Ser. No. 712,153
3 Claims. (Cl. 29—548)

This invention relates to bridging and joining frames, being concerned more particularly with frames of that character which bridge between the surface of an inset article or appliance and the surface of the structure within which it is inset, examples of which are stoves, sinks, and the like, which are inset within cutout openings in counter tops, with a frame joining the surface of the appliance with the surface of the counter top by bridging between the two surfaces.

The principal object is to provide a one-piece bridging and joining frame of the stated character (also sometimes termed a mounting frame) having sharp corners and of such construction as to permit a square or sharp-cornered appliance to be mounted and framed within an inset opening having sharp or square corners and being only slightly larger than the extent of the appliance, whereby a comparatively narrow rim serves to bridge and join the appliance surface with the surface within which the appliance is inset.

Heretofore, one-piece bridging and joining frames employed for the purpose herein indicated have been constructed with rounded corners produced by bending a length, or strip, of frame stock, which is then welded together at the ends. These rounded corners of the one-piece frame, have required that the corners of the appliance and of the inset opening be correspondingly rounded. Such a rounded-corner frame is open to objections such as (1) that the rounded corners detract from the appearance of the frame, and (2) that there is often considerable on-the-job difficulty in producing a suitable rounded-corner inset opening, as by a sawing operation.

According to the invention, the foregoing difficulties are overcome by constructing a square-cornered mounting and bridging frame of a single piece of strip stock by first suitably notching the inside portion of the strip at each proposed corner location, followed by a suitably controlled bending operation, followed in turn by a suitable welding or other joining at the ends of the frame strip.

A feature of the invention is that the frame stock is pre-curved sufficiently to offset the tendency of the sides of the frame to bow outwardly, as a result of spring tension imparted at the corner portions, when the arms of the frame are brought together and held in the final joined condition.

Appliance frames of the type discussed above usually are made from T-shaped stock of which the crown portion is the exposed bridging part of the frame and the stem portion is employed to clamp the frame in position. Certain features of this invention, however, are not concerned with the use of T-shaped frame stock.

While frame stock suitable for use in frames embodying this invention may be produced by various methods and of various materials, as by extruding a suitable material, such as a selected plastic or an aluminum alloy, it has been chosen to illustrate the invention as applied to a frame constructed of T-shaped stock produced by suitably folding lengthwise a strip of comparatively thin sheet metal, such as a stainless steel. A strip of this T-shaped stock, cut to length, is prepared for bending at the desired corner zones by a first notching operation which removes a suitable portion of the stem at each proposed corner location, followed by a notching operation to remove a portion of the crown at each such location.

The crown notch opens on the side of the strip which is to be on the inside of the completed frame. In the example shown, it extends more than half way through the crown, and is V-shaped, with the sides about 90° divergent for the illustrated four-sided, square-cornered frame.

A feature of the construction of the notched strip is that the apex portion of the crown notch is enlarged by a rounded-outline extension which has been found to be important to the success of the bending operation.

Alternative forms of the improved frame structure are disclosed with respect to the location and manner of the joining together of the ends of the bent frame stock to comprise the unitary frame. In one form, the joining is accomplished intermediate one of the side limbs of the frame, while in other forms the joining is accomplished at a corner of the frame, either by welding the outside portion of the crown, or by suitably joining the depending stem of the two corner-abutting side members together.

The above mentioned and other features and objects of this invention and the manner of attaining them will become more apparent, and the invention itself will be understood, by reference to the following description of embodiments of the invention taken in conjunction with the accompanying drawings comprising FIGS. 1 to 13, wherein:

FIG. 3 shows apparatus by which ribbon stock is formed into T-shaped frame stock, is straightened, and is given the desired curvature;

Figure 1:
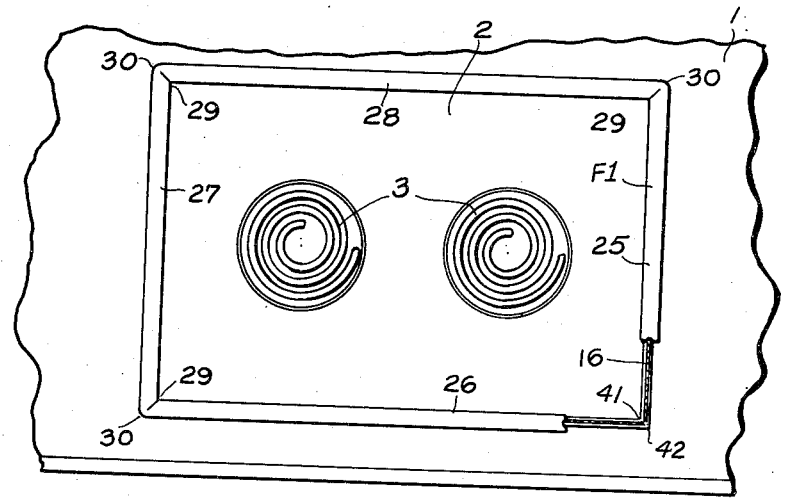
FIGS. 1 and 2 are views of a frame F1 according to the invention as employed to bridge the junction between the surface of an inset appliance and the surface of the structure into which it is inset.
Figure 2:
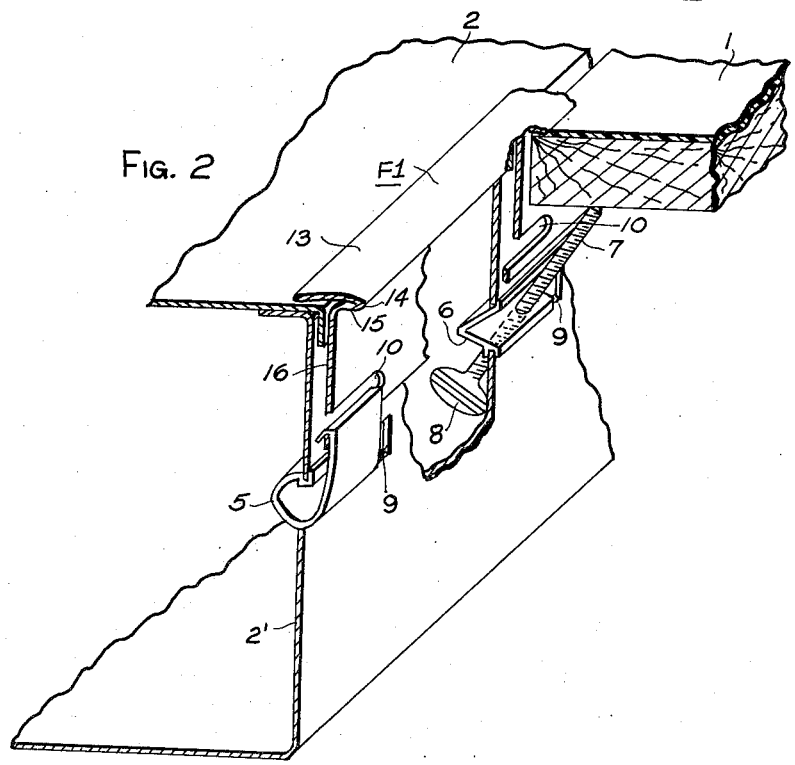

FIGS. 4 to 6, together with auxiliary views FIGS. 4A to 6A, show progressive steps in preparing a strip of the frame stock produced at FIG. 3 for the corner-bending operation;

FIG. 7 illustrates the bending of the strip of FIGS. 5 and 6 to form a partially completed frame;

FIGS. 8 and 9 illustrate the completed frame formed by welding together the ends of the bent structure of FIG. 7 to provide a frame as for use at FIGS. 1 and 2;

FIGS. 10 and 11 illustrate the construction of a modified form of the improved frame; and FIGS. 12 to 14 show a further modified form of the improved frame construction.

Referring more particularly to FIGS. 1 and 2, the rectangular frame F1 of FIG. 8 is shown employed to join the appliance 2 to the counter top 1 and to bridge the juncture between the surface thereof. Appliance 2 may be a two-burner electric stove, having the conventional burners 3, and it may comprise a top member 2 and an attached enclosing box 2'.

As shown at the lower right in FIG. 1, appliance 2 may have sharp and square outside corners 41 and the inset opening in counter top 1 may have sharp and square inside corners 42.

The frame F1 may be composed of stock having a T-shaped cross-section, as seen best in FIG. 2. The frame F1 comprises an exposed slightly concave crown portion 13 which is folded inwardly at 14 to provide an underlying portion 15, which is bent downwardly near the middle of crown 13 to provide the depending stem 16.

The stem 16 of each of the sides 25 to 28 of the frame F1 is provided with a suitable number of attaching slots 10, desired ones of which are employed to fasten the frame F1 in position.

The side walls of the box 2' are pierced at locations corresponding to desired ones of the slots 10 to provide slots 9. Frame F1 is preferably attached to the appliance 2, 2' before the appliance is installed. For this purpose, two or more spring-steel attaching clips 5 may be inserted to the position indicated in FIG. 2 for each of the sides 25 to 28 of the frame, as by a suitable tool (not shown). Each spring clip 5 exerts a substantial downward pull on stem 16 to hold the single thickness inside portion of crown 13 firmly against surface 2. It will be understood, of course, that any suitable or desired other arrangement for securing the frame in place on the appliance through downward tension on stem 16 may be employed.

The counter 1 may be of the usual wooden construction, as indicated in FIG. 2, and is commonly of plywood to which a covering finish material is applied. When the appliance 2, with frame F1 attached, is to be installed within counter top 1, a straight-sided and square-cornered inset opening is first made in the counter top, as by sawing. The installed appliance is held securely in place in the inset opening as by a desired number of hold-down clips 6 and thumb screws 7, 8, preferably two or more for each side of the frame. Any such clip 6, with its screw 7 partly retracted, is inserted in a vacant slot 9 in a side wall 2' to the position of the clip shown in FIG. 2. Access to the head 8 of any thumb screw may be had through the burner openings, burners 3 being removable to give free access to the inside of box 2' from above. As any screw 7 is tightened, as through turning the head 8, it encounters the underside of counter 1 to secure the desired hold-down action.

If desired, a suitable sealing or calking compound may be used underneath the crown 13 of frame F1, between it and the surface 2 and between it and the surface 1, as is customary when frames of this character are used around kitchen sinks installed in inset relation to a counter top.

FIG. 3 indicates the process by which frame stock is produced in a continuous strip 12 from ribbon stock S for the production of frames such as F1 of FIGS. 1, 2, 8, 9. Ribbon stock S may be fed from a spool (not shown) from which it may pass through former F and straightening block SB in a continuous operation in the direction indicated by the arrow. Within the former F, the moving stock S is folded, to the desired T-shaped cross-section, as by roll-forming apparatus (not shown), to provide the unstraightened frame stock 11. The unstraightened frame stock 11 passes through the straightening block SB, wherein it is subjected to conventional straightening operations to remove irregularities, and wherein it is also formed slightly to give the frame strip an upward curvature about the folded edge 14 of the crown, which is the outer edge of the frame strip when it is incorporated in a frame such as F1. This slight curvature manifests itself in FIG. 7 as an inward bow of untensioned arms 26 to 28.

The formed, straightened, and precurved continuous strip of stock 12 of FIG. 3 is cut into lengths according to the size of frame to be produced. One such length 21 is shown in FIG. 4, with an end view thereof in FIG. 4A. The noted slight curvature of the frame strip appears in strip 21, about folded edge 14.

The length of frame stock 21 of FIGS. 4 and 4A undergoes three punching operations to become the punched strip 22 of FIGS. 5 and 5A. These operations are (1) a stem-perforating operation to provide slots 10 in stem 16 which may be employed as shown in FIG. 2, (2) a stem-notching operation which removes a section of stem 16 at each of the locations which is to become a corner of the completed frame, and (3) a crown-notching operation to produce the notches 18, from crown 13 and from a portion of underlying layer 15, at each of the locations which is to become a corner of the completed frame. Each notch 18 is generally V-shaped, entering the crown 13 of the strip from the single-thickness side and extending about three-quarters of the way across the crown. At the apex of each notch 18, there is a small rounded enlarging indentation 19, as seen best in FIG. 6.

The punched and notched frame strip 22 of FIGS. 5 and 6 is next bent to close the notches 18 to provide an incomplete open-end frame as indicated in FIG. 7.

FIG. 7 also shows in top view a clamping vise 20 which is used to clamp the unnotched section of the crown strip at each notched location to hold it against buckling while the corner bend thereat is made. FIG. 7 shows the structure with three bends having already been made, (1) at the junction of sides 27, 28, (2) at the junction of sides 26, 27, and (3) at the junction of sides 25 and 26. It will be observed that the three corners 25 and 26 already bent have opened somewhat upon the bending force having been removed, which is due to the springiness of the frame stock material exhibited at the corners where the bending has occurred.

The final stage of the bending of the fourth corner of the frame structure between sides 24 and 25, is illustrated in FIG. 7, with the junction of sides 24 and 25 being held within the vise 20, which may be a hydraulically closed device having sufficient pressure betwen the jaws thereof as to clamp the frame material with sufficient tightening to prevent deformation of the crown material out of the plane of the exposed surface of the frame while permitting sufficient slippage to permit the clamped material to twist and slide within the vise as the bending occurs. The bending force is inward at points such as 20A and 20B, and may be applied by hand.

It will be observed that the bending in FIG. 7 of the corner between side parts 24 and 25 is carried out until the associated notch 18 becomes completely closed.

The bending of the double-thickness unnotched corner portion of the crown (crown proper 13 and underlying layer 15), between the widened apex portion 19 of a notch 18 and the doubled outer edge 14, is partly an elongation of the material at outer edge 14 of the stock and partly a compression of the inner portion of the bent material. The inward tension incident to the stretching of the outside material gives rises to the slight rounding of the outside corners 30 of FIGS. 1, 8, 9. The inward tension at a corner being bent, by applying a compression to the material at the inside region of the bend, coupled with the action of the jaws of vise 20 in preventing any observable thickening at the bend, causes the material at the bend to flow inwardly just sufficiently to fill the apex enlargement 19 of notch 18 whereat the bend is being made. As a result, the sides of any notch 18 completely abut each other in the final bending stage, the indentation 19 having disappeared by being filled up by the inwardly flowing displaced material.

When the bending force is removed from arms 24 and 25 and the material is removed from vise 20, arms 24 and 25 spring apart somewhat, and the sides of the included notch 18 separate slightly, as is shown for example for sides 27 and 28. Also, sides 24 and 25, which are shown straight in FIG. 7 with force applied at 20A and 20B, resume the slight concave curvature when released, as shown in FIG. 7 for the sides 26 to 28, being the pre-formed curvature imparted to the strip stock 12 as it emerges from straightening block SB, FIG. 3.

The structure of FIG. 7, after removal from vise 20, may next be placed within a suitable welding jig (not shown) wherein the lower corners (joining side 26 to sides 25 and 27) are clamped, following which the ends of side members 24 and 28 may be brought inwardly squarely together and welded by a suitable butt welding process which produces the welded joint 31 of FIG. 8.

The inward force exerted in the welding jig (not shown) to bring the sides of the frame together to produce the square-cornered structure of FIG. 8 recloses the open notches 18 illustrated at three of the corners at FIG. 7, and at the same time applies a force opposing the pre-formed curvature in the frame stock to provide the substantially straight sides illustrated in FIG. 8. Without the noted pre-formed curvature, each of the sides of the completed frame in FIG. 8 would be bowed out slightly because of the tension necessary to hold the material together at corners 29 to close the notches 18 of FIG. 7. In practice, a small gap of five to ten thousandths of an inch at each of the inside corners 29 has not been found to be objectionable.

It will be observed that each of the inside corners 29 of FIG. 8 is of square mitered construction which extends outwardly toward the corresponding outside corner 30, which is also substantially a square corner, except for a slight outside radius of pleasing appearance which is formed automatically as a result of the described bending operation.

Any burr thrown up at 31 of FIG. 8 by the noted welding operation may be removed by the usual grinding and/or polishing techniques to give the exposed surface of the finished article a smooth and unbroken appearance.

In FIG. 9, the upper right-hand corner portion of the frame of FIG. 8 (between side members 24 and 25) is enlarged somewhat to give a better view of the corner formation, particularly showing that the stem portions 16 of the adjoining side members may closely abut each other without mutual interference.

*Welded-Corner Embodiment—FIGS. 10 to 12*

In the construction according to FIGS. 7 and 8, with a weld at 31 to provide a side which was previously two separate members 24, 28, it has been found that some warpage of the crown portion of the combined side 24, 28 may result unless the welding operation is very accurately carried out, as by precision welding equipment. Where this warpage is found to occur, or where precision welding equipment is not available, the construction of FIGS. 10 and 11 is recommended as satisfactory.

FIG. 10 illustrates the modified frame construction in readiness for the parts to be brought together for the welding of the open corner. The structure of FIG. 10 comprises the four side members 124 to 127, with the open end of each of the side members 124 and 127 being mitered, each to fit with the other to provide a square corner.

The pre-notching operations described in connection with FIGS. 5 and 6 are assumed to have been performed for the structure of FIG. 10, along with the noted mitering of the ends of the strip stock, and the three indicated bent corners of the structure of FIG. 10 are assumed to have been bent, as by using a vise 20 shown in FIG. 7. Additionally, the sharp outside corners of each of the side members 124 and 127 are assumed to have been sheared as at 130A and 130B to the end that a rounded outside corner 130 may appear at the junction of these members when they are brought together as shown in FIG. 11 and welded to provide the finished frame F2. This finishing operation may comprise placing the structure of FIG. 10 in a suitable welding jig which brings the arms 124 to 127 thereof together as shown in FIG. 11, following which the outside corner portion of parts 124 and 127 are welded together at 131 to join these parts and give them the same general appearance as the other three corners of the frame F2. The zone of welding may be caused to be unnoticeable by employing the usual grinding and/or polishing techniques previously referred to in connection with welded joint 31 of FIG. 8.

*Stem-Joined Embodiment—FIGS. 12 to 14*

FIGS. 12 to 14 illustrate a further frame F3 which is constructed generally like the frame F2 of FIGS. 10 and 11, and having corresponding sides 224 to 227, inside corners 229, and outside corners 230, but wherein the open corner is held closed by joining the stem 16 of arm 224 to the stem 16 of arm 227. There is thus produced an unwelded miter joint at 231. For the corner-closure purpose, it is preferred to employ a metal corner member 222 which is shown lying just outside of the webs 16 of the arms 224 and 227, and which is shown joined to these webs by spot-welding, as at points 235. A joint of considerable rigidity is thus provided. It has been found in practice that any tendency toward warpage of the frame F3 as a result of the welding of this joint is entirely negligible.

In connection with the frame F2 of FIGS. 10 and 11 and frame F3 of FIGS. 13 and 14, where the final joining is at corners 131 and 231, it will be observed that an outward force tending to deform the sides of the frame is exhibited at only three of the four corners, with the joining corner not exhibiting that outward deforming force. Nevertheless, it has been found that frame stock pre-curved as described in connection with FIGS. 3 to 9 is satisfactory in connection with the structure of FIGS. 10 to 14. There, the two sides of the frame remote from the final joining corner tend to be perfectly straight because the outward tension of the associated corners just compensates for the pre-formed curvature of the material, with some slight, but ordinarily unnoticeable concave curvature remaining in the two sides adjacent the final corner of joining.

While I have described above the principles of my invention in connection with specific apparatus, it is to be clearly understood that this description is made only by way of example and not as a limitation to the scope of my invention.

I claim:

1. The method of producing, from a strip of malleable and ductile frame stock, a multi-sided frame having a sharp corner where two sides meet, which comprises removing material from the side of the strip which is to be inside the frame to provide a generally V-shaped notch at the desired location of the sharp corner, yieldingly clamping between opposed surfaces the portion of the frame strip disposed opposite the notch and including the apex of the notch, and applying to the strip at points located in opposite directions from the notch a force which bends the clamped unnotched portion to substantially close the notch, the clamping surfaces controlling and limiting the tendency of the bent portion to become thicker at any point than the general thickness of the strip, the notch having a widened portion at the apex into which material displaced from the adjoining unnotched portion is forced to flow when compressed between the clamping surfaces while the said bending is occurring, the notch being so sized that it is substantially completely filled by the said displaced material.

2. The method of producing, from a strip of malleable and ductile crown-and-stem frame stock of T-shaped cross section, a multi-sided frame having a sharp corner where two sides meet, which comprises (1) removing a section of the stem from the strip at the desired location of each sharp corner, (2) removing material from the side of the strip which is to be inside the frame to provide a generally V-shaped notch at the desired location of each said sharp corner, each said notch including a widened apex portion, (3) yieldingly clamping between opposed surfaces the portion of the frame strip disposed opposite any said notch and including the apex of the notch, and (4) applying to the strip at points located in opposite directions from the notch a force which bends the clamped unnotched portions to substantially close the notch, the clamping surfaces controlling and limiting the tendency of the bent portion to become thicker at any point than the general thickness of the strip, the said widened apex portion being substantially completely filled during the bending operation by displaced material forced to flow therein.

3. The method of producing, from a strip of malleable and ductile springy frame stock, a closed multi-sided frame, which comprises (1) curving the strip in the direction which will tend to produce a concave bow in each side of the frame, (2) removing material from the side of the strip which is to be inside the frame at locations spaced apart to correspond to the desired side lengths of the frame to provide a deep V-shaped notch at each such location, such notches dividing the strip into side lengths which are left connected by the unremoved material between the notch and the outside edge of the strip, (3) yieldingly clamping between opposed surfaces the portion of the strip disposed opposite any said notch, (4) applying a force to each adjacent side portion which bends the clamped unnotched portion to close the notch, the said clamping and bending steps being performed for each said notch, and (5) securing the ends of the notched and bent stock together to complete the frame, the tendency of the bent corners to spring apart to thus bow the sides of the frame convexly being offset by the said tendency toward a concave bow imparted by the said curving step.

References Cited in the file of this patent
UNITED STATES PATENTS

| | | |
|---|---|---|
| 699,858 | Vollmer | May 13, 1902 |
| 709,282 | Vollmer | Sept. 16, 1902 |
| 1,615,823 | Barclay | Feb. 1, 1927 |
| 2,126,544 | Everhard | Aug. 9, 1938 |
| 2,219,595 | Lang | Oct. 29, 1940 |
| 2,462,199 | Kehoe et al. | Feb. 22, 1949 |
| 2,680,250 | Kerby | June 8, 1954 |
| 2,714,944 | Bongiovanni | Aug. 9, 1955 |
| 2,737,707 | Highet et al. | Mar. 13, 1956 |
| 2,831,244 | Adell | Apr. 22, 1958 |